(12) United States Patent
Kuse et al.

(10) Patent No.: US 6,558,051 B2
(45) Date of Patent: May 6, 2003

(54) FILM SCANNING DEVICE PROVIDED IN AUTOMATIC DEVELOPING APPARATUS

(75) Inventors: Satoru Kuse, Tokyo (JP); Koji Takemura, Tokyo (JP); Katsutoshi Sawada, Tokyo (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/808,599

(22) Filed: Mar. 14, 2001

(65) Prior Publication Data

US 2001/0022898 A1 Sep. 20, 2001

(30) Foreign Application Priority Data

Mar. 17, 2000 (JP) .......................................... 2000-076988

(51) Int. Cl.[7] .............................................. G03D 13/00
(52) U.S. Cl. ........................ 396/567; 396/568; 396/570; 396/639; 355/27
(58) Field of Search .................................. 396/567–570, 396/578, 599, 620, 639; 355/27–29, 40, 41; 358/408, 487

(56) References Cited

U.S. PATENT DOCUMENTS

| | | | | |
|---|---|---|---|---|
| 5,101,286 A | * | 3/1992 | Patton | 358/487 |
| 5,432,580 A | * | 7/1995 | Tokuda | 396/639 |
| 5,949,551 A | * | 9/1999 | Miller et al. | 358/408 |
| 6,198,526 B1 | * | 3/2001 | Ohtsuka | 355/40 |
| 6,244,761 B1 | * | 6/2001 | Manico et al. | 396/567 |
| 6,296,993 B1 | * | 10/2001 | Sowinski et al. | 430/404 |
| 6,388,732 B1 | * | 5/2002 | Williams et al. | 355/40 |
| 2001/0033752 A1 | * | 10/2001 | Cook et al. | 396/564 |

* cited by examiner

Primary Examiner—Della J Rutledge
(74) Attorney, Agent, or Firm—Frishauf, Holtz, Goodman & Chick, P.C.

(57) ABSTRACT

An automatic processing apparatus is provided which includes a processing station for photographic-processing a film; a scanner for scanning the film during the photographic-processing by the processing station; an image data memory device for storing image data acquired by the scanner; and an image output device for outputting the image data stored in the image data memory device in parallel with a following photographic-processing.

7 Claims, 5 Drawing Sheets

FILM SCANNING DEVICE PROVIDED IN AUTOMATIC DEVELOPING APPARATUS

BACKGROUND OF THE INVENTION

The present invention relates to an improvement of a film scanning device which scans a color film to obtain image data, and which is provided in an automatic photographic processing and scanning apparatus conducting a series of photographic processes for the color film.

As a general rule, a color negative film is subjected to film development, and then, is scanned by a film scanner so that images on the color negative film are converted into digital images which are used by a digital printer to make a print. However, in the winter season, or in a dry area, charged dust floating in a job environment or in air tends to stick to a processed film, and when converting into a digital image with a scanner by using the film on which the dust is sticking, there are caused noises and print quality is deteriorated, which has been a big problem.

Therefore, a neutralizing device or an air spray has been provided in a scanner section to remove dust, but it was not sufficient in the actual circumstances.

Further, it has been strongly demanded from the market side that efficiency of recording, on an image data recording medium, the image data obtained through scanning be enhanced in point of time, and that management of the image data recording medium be made easier.

As an apparatus to comply with the aforesaid demand, there has been known an automatic photographic processing and scanning apparatus which conducts a series of photographic processes for a color negative film and which obtains image data by scanning the color film during the series of developing processes before the film is dried.

SUMMARY OF THE INVENTION

Image data obtained through scanning are used for making prints to be offered to a customer, or they are stored in a recording medium for recording the data desired by the customer. On the other hand, a film for which photographing processing has been finished is handed to a user, and the developed film can be used for reprinting, for image reading by a film scanner and for image processing.

In the conventional system, however, film scanning has been separated from outputting of images obtained through reading. In the conventional system, for example, print processing has been started after scanning of the film and photographic processing are completely finished, or only scanning of a film is conducted, and the film is scrapped during the processing, resulting in no implementation of print processing. Under this condition, a customer has to wait, and it is impossible for a photofinisher to conduct efficient processing.

In the known scanning of a film during a series of developing processes before the film is dried, it is difficult to obtain image data with stabilized image quality, which needs to be solved.

Tasks to be achieved by the invention include enhancement of output of image data obtained through scanning in the apparatus stated above, namely, enhancement of efficiency in terms of time for print processing or for recording on an image data recording medium, easy management of image data recording media, and improvement of image quality of image data obtained through scanning.

The object of the invention is attained by any of the following structures 1 through 22.

Structure 1: An automatic photographic processing and scanning apparatus that conducts photographic processing for a transmission type film and scans the transmission type film to read as image data, wherein there is provided an image data acquiring means that acquires image data by scanning the transmission type film during the photographic processing, and the image data acquiring means scans a part of the transmission type film that is almost in the vertical direction.

Structure 2: An automatic photographic processing and scanning apparatus that conducts a series of processes including color developing, bleaching, fixing and stabilizing for a color film, and acquires image data by scanning the color film, wherein there are provided a processing tank with fixing ability, a stabilizing tank that conducts the stabilizing processing, and an image data acquiring means that acquires image data by scanning the color film that is on the way from the fixing tank to the stabilizing tank, and the image data acquiring means scans a part of the color film that is almost in the vertical direction.

Structure 3: An automatic photographic processing and scanning apparatus that conducts photographic processing for a transmission type film and scans the transmission type film to read as image data, wherein there is provided an image data acquiring means that acquires image data by scanning the transmission type film during the photographic processing, and the image data acquiring means scans a part of the transmission type film that is almost in the horizontal direction, and is positioned above the part of the transmission type film in the vertical direction.

Structure 4: An automatic photographic processing and scanning apparatus that conducts a series of processes including color developing, bleaching, fixing and stabilizing for a color film image data acquiring means, and acquires image data by scanning the color film, wherein there are provided a processing tank with fixing ability, a stabilizing tank that conducts the stabilizing processing, and an image data acquiring means that acquires image data by scanning the color film that is on the way from the fixing tank to the stabilizing tank, and the image data acquiring means scans the color film that is almost in the horizontal direction, and is positioned above the part in the vertical direction.

Structure 5: An automatic photographic processing and scanning apparatus that conducts photographic processing for a transmission type film and scans the transmission type film to read as image data, wherein there are provided an image data acquiring means that acquires image data by scanning the transmission type film during of the photographic processing, and a roller that comes in contact with the transmission type film immediately before the path through which the transmission type film advances to the image data acquiring means, and a material of the roller has the water absorption property.

Structure 6: An automatic photographic processing and scanning apparatus that conducts a series of processes including color developing, bleaching, fixing and stabilizing for a color film image data acquiring means, and acquires image data by scanning the color film, wherein there are provided a processing tank with fixing ability, a stabilizing tank that conducts the stabilizing processing, an image data acquiring means that acquires image data by scanning the color film that is on the way from the fixing tank to the stabilizing tank, and a roller that comes in contact with the color film on the path through which the color film arrives at the image data acquiring means after coming out of a solution in the fixing tank, and a material of the roller has the water absorption property.

Structure 7: The automatic photographic processing and scanning apparatus according to Structures 5 and 6, wherein the roller having the water absorption property is porous.

Structure 8: The automatic photographic processing and scanning apparatus according to Structures 5 and 6, wherein a material of the surface of the roller having the water absorption property is either one of polybutyl terephthalate, polyphenylene ether, polypropylene, polyurethane, vinyl chloride, polyethylene and polyvinyl alcohol.

Structure 9: An automatic photographic processing and scanning apparatus that conducts photographic processing for a transmission type film and scans the transmission type film to read as image data, wherein there is provided an image data acquiring means that acquires image data by scanning the transmission type film during the photographic processing, and the image data acquiring means scans the transmission type film whose conveyance is stopped.

Structure 10: An automatic photographic processing and scanning apparatus that conducts a series of processes including color developing, bleaching, fixing and stabilizing for a color film, and acquires image data by scanning the color film, wherein there are provided a processing tank with fixing ability, a stabilizing tank that conducts the stabilizing processing, and an image data acquiring means that acquires image data by scanning the color film that is on the way from the fixing tank to the stabilizing tank, and the image data acquiring means scans the color film whose conveyance is stopped.

Structure 11: The automatic photographic processing and scanning apparatus according to Structures 9 and 10, wherein each of the transmission type film in Structure 9 and the color film in Structure 10 has a plurality of image frames, and the image data acquiring means scans the color film whose conveyance is stopped for each image frame.

Structure 12: An automatic photographic processing and scanning apparatus that conducts photographic processing for a transmission type film and scans the transmission type film to read as image data, wherein there are provided an image data acquiring means that acquires image data by scanning the transmission type film during the photographic processing, and an image data recording means that records image data acquired by the image data acquiring means on an image data storing medium, and the image data recording means records collectively image data equivalent to one roll of the transmission type film.

Structure 13: An automatic photographic processing and scanning apparatus that conducts a series of processes including color developing, bleaching, fixing and stabilizing for a color film, and acquires image data by scanning the color film, wherein there are provided a processing tank with fixing ability, a stabilizing tank that conducts the stabilizing processing, an image data acquiring means that acquires image data by scanning the color film that is on the way from the fixing tank to the stabilizing tank, and an image data recording means that records image data acquired by the image data acquiring means on an image data storing medium, and the image data recording means records collectively image data equivalent to one roll of the color film.

Structure 14: An automatic photographic processing and scanning apparatus that conducts photographic processing for a transmission type film having a magnetic layer, and scans the transmission type film to read as image data, wherein there are provided an image data acquiring means that acquires image data by scanning the transmission type film during the photographic processing and a magnetic information reading means that reads magnetic information recorded on the magnetic layer, and the magnetic information reading means reads out specific magnetic information recorded on the magnetic layer before the photographic processing.

Structure 15: An automatic photographic processing and scanning apparatus that conducts a series of processes including color developing, bleaching, fixing and stabilizing for a color film having a magnetic layer, and acquires image data by scanning the color film having the magnetic layer, wherein there are provided a magnetic information reading means that reads magnetic information recorded on the magnetic layer, a processing tank with fixing ability, a stabilizing tank that conducts the stabilizing processing, and an image data acquiring means that acquires image data by scanning the color film having the magnetic layer that is on the way from the fixing tank to the stabilizing tank, and the magnetic information reading means reads out specific magnetic information recorded on the magnetic layer before a series of color developing, bleaching, fixing and stabilizing processes are conducted.

Structure 16: The automatic photographic processing and scanning apparatus according to Structures 14 and 15, wherein the specified magnetic information represents information concerning print sizes.

Structure 17: The automatic photographic processing and scanning apparatus according to Structures 14 and 15, wherein the specified magnetic information represents information concerning conditions of photographing by a camera on the transmission type film in Structure 14 having the magnetic layer or the color film in Structure 15.

Structure 18: The automatic photographic processing and scanning apparatus according to Structures 14 and 15, wherein the specified magnetic information represents information that specifies image frames which have been exposed.

Structure 19: The automatic photographic processing and scanning apparatus according to Structures 14 and 15, wherein the specified magnetic information represents information that specifies image frames to be scanned by the image data acquiring means.

Structure 20: An automatic photographic processing and scanning apparatus that conducts photographic processing for a transmission type film and scans the transmission type film to read as image data, wherein there are provided at least an image data acquiring means that acquires image data by scanning the transmission type film during the photographic processing, an image data storing means that stores image data acquired by the image data acquiring means, and an image recording means that records image data stored by the image data storing means or a recording medium.

Structure 21: An automatic photographic processing and scanning apparatus that conducts photographic processing for a transmission type film and scans the transmission type film to read as image data, wherein there are provided at least an image data acquiring means that acquires image data by scanning the transmission type film during the photographic processing, an image data storing means that stores image data acquired by the image data acquiring means, and an image output means that outputs image data stored by the image data storing means.

Structure 22: An automatic photographic processing and scanning apparatus that conducts photographic processing for a transmission type film and scans the transmission type film to read as image data, wherein there are provided at least an image data acquiring means that acquires image data by scanning the transmission type film during the photographic processing, an image data storing means that stores image data acquired by the image data acquiring means, and a communication means that makes it possible to transmit the image data stored by the image data storing means through a network.

DETAILED DESCRIPTION OF THE PREFERRED EMBODIMENT

Figure 1:
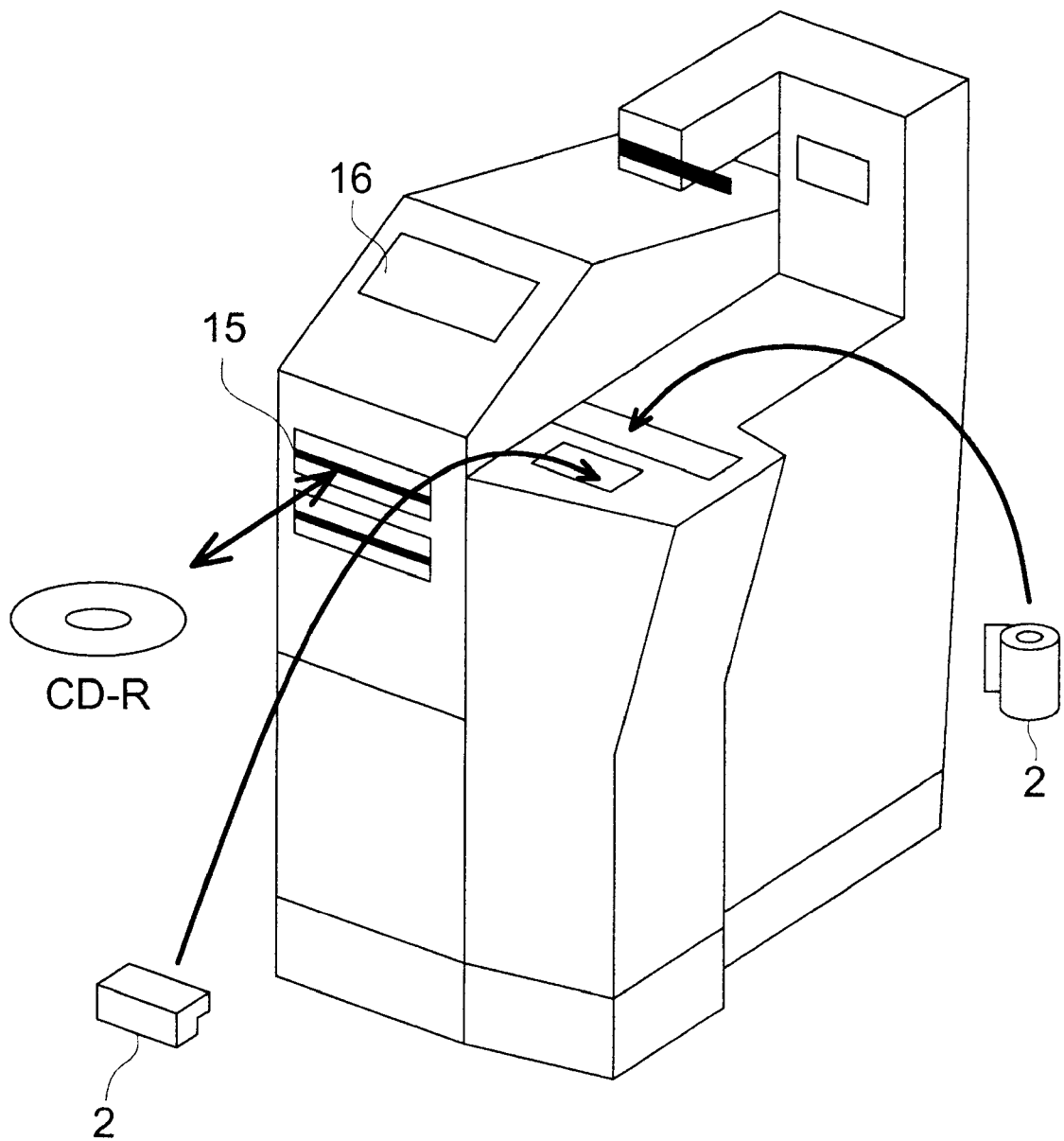
FIG. 1 is an external view.

An embodiment of the invention will be explained as follows, referring to FIG. 1–FIG. 5. However, the embodiment of the invention is not limited to the following. Incidentally, in FIG. 1–FIG. 5, those which are common in other drawings are given the same symbols.

Though processing of color films may be explained in the following, the invention is not limited to this and it can be applied to almost all of transmission type films. A color film (included in a transmission type film) and a transmission type film may also be one provided with a magnetic layer on which magnetic information can be written. Incidentally, the transmission type film means those including a color negative film, a color reversal film, a black and white film, a copying film, an X-ray film and a lith film.

Examples of general processing steps for a color negative film (included in a color film) are as follows.

(1) Color developing→bleaching→fixing→washing→drying
(2) Color developing→bleaching→fixing→washing→stabilizing→drying
(3) Color developing→bleaching→fixing→stabilizing→drying
(4) Color developing→bleaching→fixing→first→stabilizing→second→stabilizing→drying
(5) Color developing→bleaching→bleach→fixing→washing→drying
(6) Color developing→bleaching→bleach→fixing→washing→stabilizing→drying
(7) Color developing→bleaching→bleach→fixing→stabilizing→drying
(8) Color developing→bleaching→bleach→fixing→first stabilizing→second stabilizing→drying
(9) Color developing→bleaching→bleach→fixing→fixing washing→stabilizing→drying
(10) Color developing→bleaching→bleach→fixing→fixing first stabilizing→second stabilizing→drying
(11) Color developing→bleach→fixing→stabilizing→drying
(12) Color developing→bleaching→first fixing→second fixing→stabilizing→drying
(13) Color developing→bleaching→fixing→first fixing second fixing→third stabilizing→drying Among the aforesaid processing steps, (3), (4), (7), (10), (11), (12) and (13) are preferable, wherein (3) and (11) are especially preferable, and (3) is used in the following.

Incidentally, the photographic processing in this case includes a series of processing steps as indicated above.

FIG. 1 is an external view of automatic photographic processing and scanning apparatus 1. This will be explained in detail as follows, referring to FIGS. 2–5.

Figure 2:
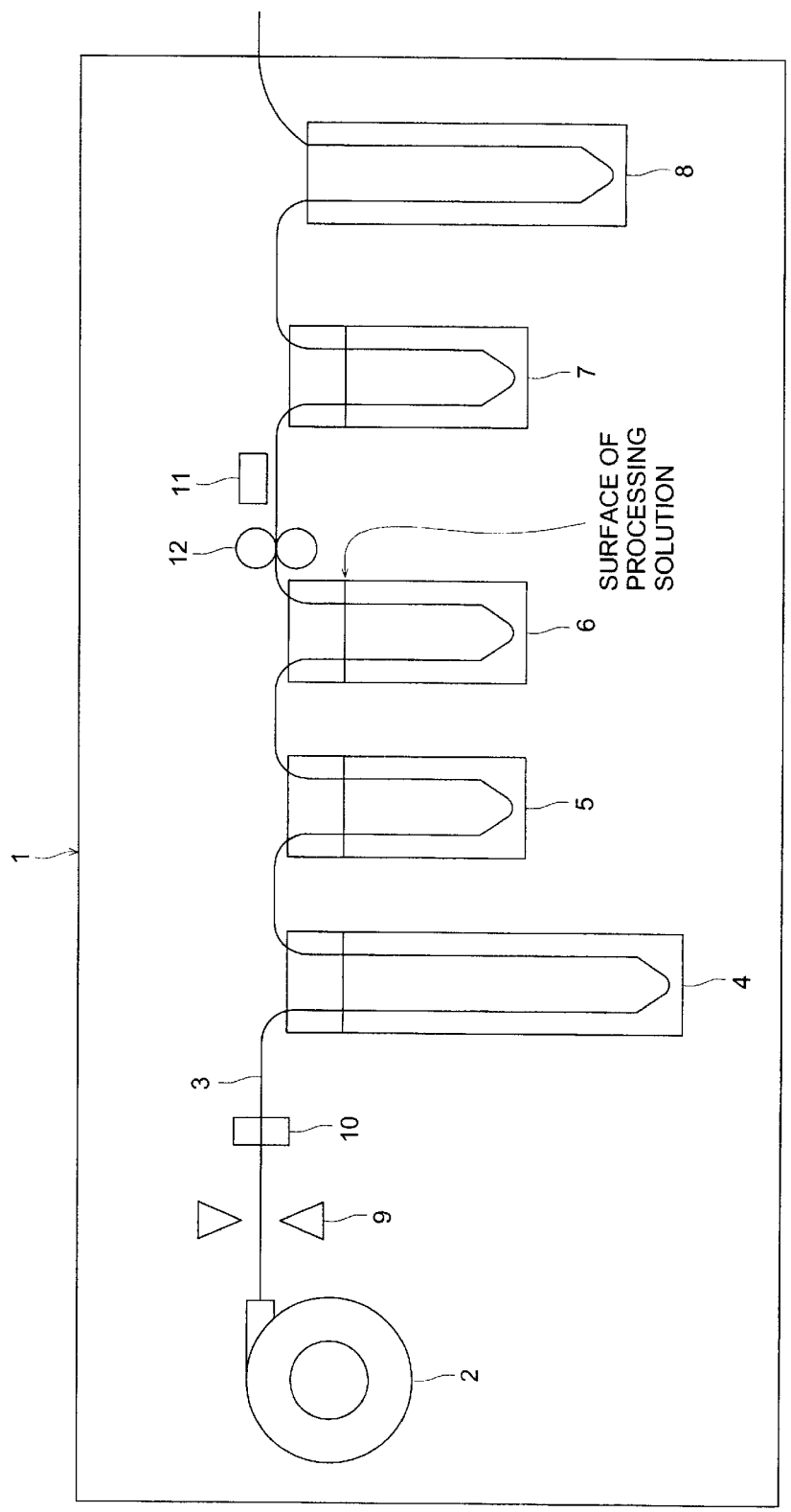
FIG. 2 is a first schematic structure diagram.

FIG. 2 is one explaining an outline concerning a series of chemical processes for a color film in automatic photographic processing and scanning apparatus 1 and others.

A trailing edge of color film 3 taken out of color film container 2 (which is generally called a patrone or a cartridge) is cut by cutter 9, and the color film 3 is conveyed through the inside of the automatic photographic processing and scanning apparatus 1. Incidentally, the cutter 9 is not always needed, and in the case of a type in which color film container 2 is engaged with color film 3, a means to release the engagement has only to be provided in place of the cutter.

In the case where the color film 3 has thereon a magnetic layer, specified magnetic information recorded on the magnetic layer is read out by magnetic information reading means 10 provided on a conveyance path for color film 3 that is on this side of a color developing tank. Namely, the magnetic information reading means 10 reads out specified magnetic information recorded on the magnetic layer before a series of color developing, bleaching, fixing and stabilizing processes which will be described later are conducted for color film 3.

Now, the color film 3 is subjected to color developing processing in color developing tank 4, to bleaching processing in bleaching tank 5, to fixing processing in fixing tank 6, to stabilizing processing in stabilizing tank 7 and finally to drying processing in drying section 8, to be ejected out.

With regard to color film 3 which is on the way from fixing tank 6 to stabilizing tank 7, image data are acquired by image data acquiring means 11 from images recorded on the color film 3. As the image data acquiring means 11, there is used CCD that acquires image data through photoelectric conversion. Further, on a path for color film 3 to go to image data acquiring means 11 after emerging out of a solution of fixing tank 3, there are provided at least a pair of rollers 12 which come in contact with the color film 3. It is preferable that at least one of the paired rollers 12 has water absorption property. The reason for this is as follows. In the case of acquiring image data by scanning color film 3 with image data acquiring means 11, when many droplets are sticking to the color film 3, these droplets disturb an optical path of an image and deteriorate quality of image data to be acquired originally. However, it is possible to lighten this adverse effect by making a material of the roller to have water absorption property. Incidentally, it is preferable that this water absorptive roller is provided on a conveyance path for a transmission type film that is located between a processing tank immediately before image data acquiring means 11 and the image data acquiring means 11, when processing a general transmission type film, and in particular, when a plurality of rollers are positioned before image data acquiring means 11, the roller immediately before the image data acquiring means 11 among the aforesaid rollers is preferable. In a method to make the roller to be water-absorptive, the material is made to be porous, or the superficial material is made to be either one of polybutyl terephthalate, polyphenylene ether, polypropylene, polyurethane, vinyl chloride, polyethylene and polyvinyl alcohol, or, a roller hardness is made to be 10–70 (Roller hardness is a hardness obtained by a measuring method by Indentec Rockwell Tester, a measuring method for Durometer hardness and a measuring method by barcol Impressor.). In this case, if surface tension of a processing solution in a processing tank positioned immediately before the roller is made to be 5–70 dyne/cm, wettability of the film surface is improved and occurrence of droplets is repressed, which is preferable. Incidentally, surface tension mentioned here is one measured by a static measuring method which measures under the static conditions, and its measuring method includes a capillary method, a bubble pressure method, a drop weight method, a pendant drop method, a sessile drop method and a ring method.

Further, when many droplets are sticking to color film 3 in a path for the color film 3 to go to image data acquiring means 11 after emerging out of a solution of fixing tank 6, the droplets fall to stick to the image data acquiring means 11 and deteriorate scanning efficiency. In FIG. 2, however, image data acquiring means 11 scans a part of color film 3 that is almost in the horizontal direction, from the position which is high in the vertical direction, which is consideration free from the problems stated above.

Since image data acquiring means 11 scans a part to be photographed on color film 3 whose conveyance is stopped, probability of vibration of droplets is low even when droplets are present on a part to be photographed on color film 3, and thereby scattering of image light of color film 3 caused by vibration of droplets can be prevented, which is an effect, and thus, image data can be obtained without= being disturbed in terms of image quality. Incidentally, since the image data acquiring means 11 scans for each frame of image frames of color film 3, the color film 3 is conveyed while it is stopped intermittently for each frame in image frames at the position where the color film 3 faces the image data acquiring means 11. For this reason, it is also possible to provide an accumulator of color film 3 between fixing tank 6 and image data acquiring means 11, though the accumulator is not illustrated here.

Figure 3:
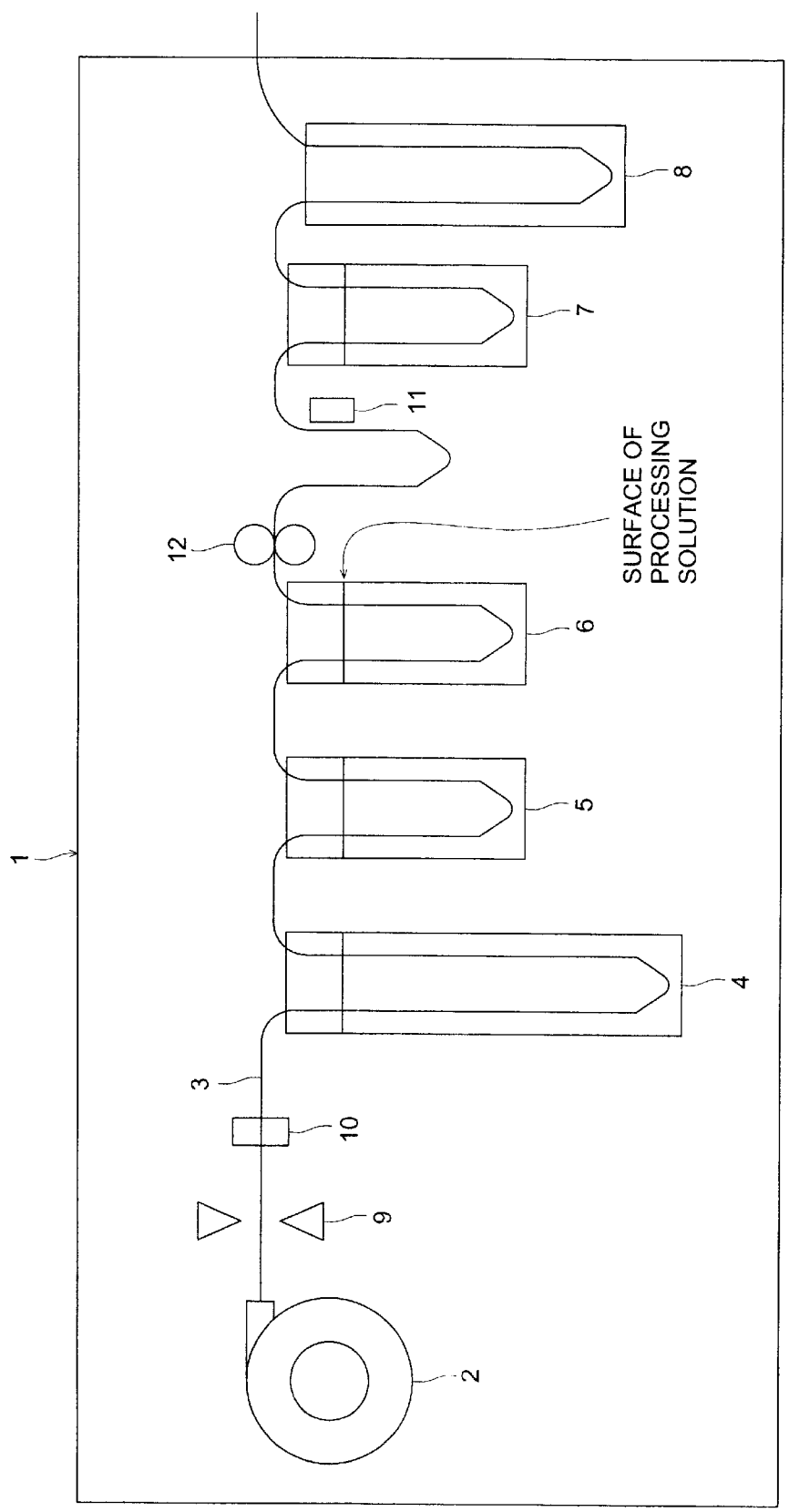
FIG. 3 is a second schematic structure diagram.

Next, explanation will be given based on FIG. 3, and only differences between FIG. 3 and FIG. 2 are the position of image data acquiring means 11 and the direction for conveyance of color film 3 at that position, and only these differences will be explained.

In FIG. 3, image data acquiring means 11 scans a part of color film 3 standing upright in the vertical direction from the position where the image data acquiring means 11 faces the color film 3. Due to this, it is devised to prevent, even when many droplets are sticking to color film 3, that the droplets fall and stick to image data acquiring means 11 to deteriorate scanning efficiency of image data acquiring means 11, in the same way as in the case in FIG. 2.

Incidentally, the image data acquiring means 11 may be either one wherein a one-dimensional linear photosensor is used or one wherein two-dimensional sheet-shaped photosensor is used. A scanning method may be either a reflection type scanning method or a transmission type scanning method.

Figure 4:
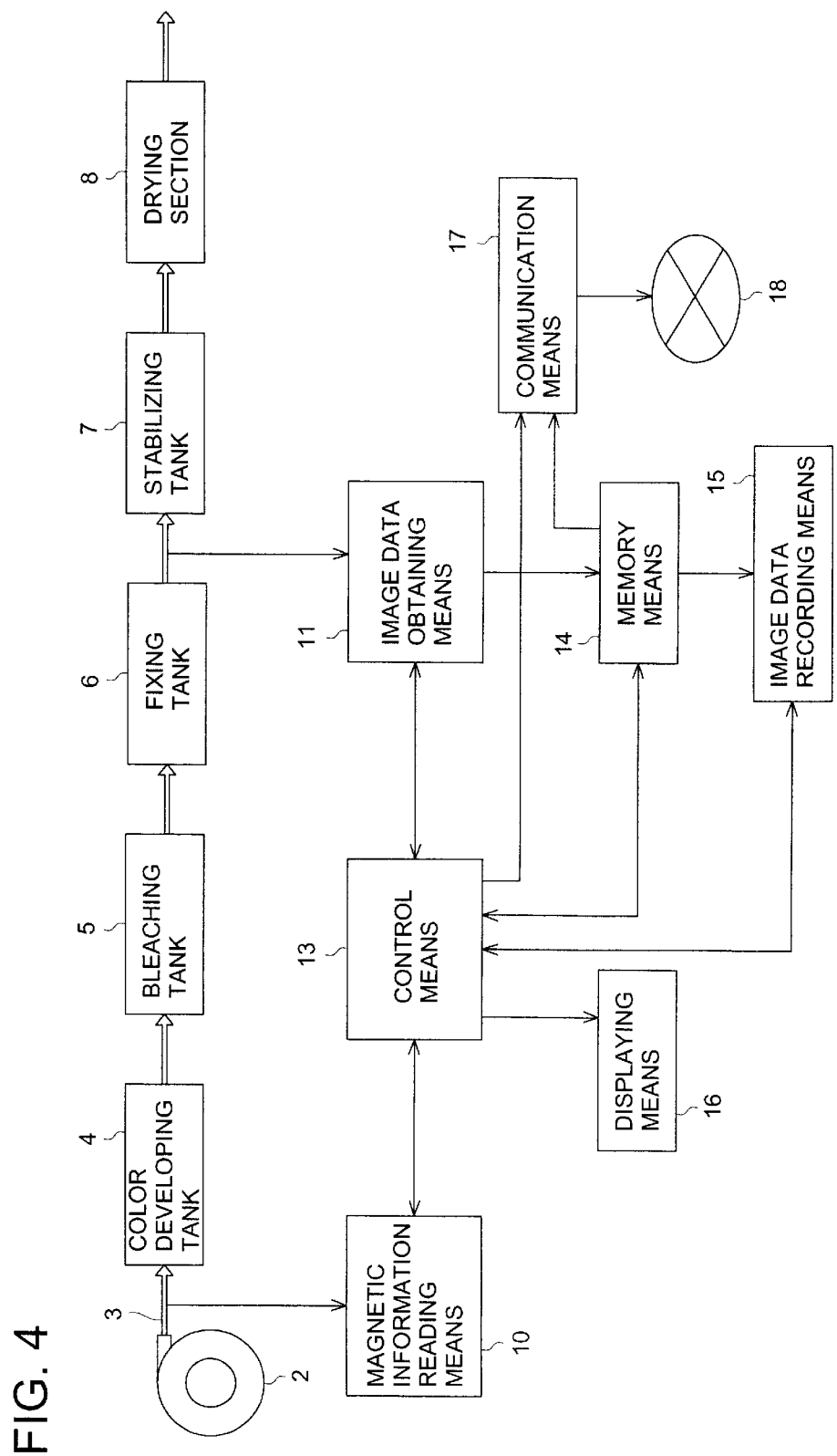
FIG. 4 is a block diagram.

Next, explanation will be given based on FIG. 4. FIG. 4 is one to explain an embodiment of the invention in a block diagram manner, by adding further a means for processing of electric signals to those explained in FIG. 2 and FIG. 3.

Control means 13 controls all over in cooperation with magnetic information reading means 10, image data acquiring means 11, storing means 14, image data recording means 15 and display means 16. As stated above, when color film 3 has a magnetic layer, the magnetic information reading means 10 is one that reads specified magnetic information recorded on the magnetic layer. This specified information includes the following four items of information; (1) information concerning print sizes (an example of the print size includes a conventional size and a panorama size, and it is sometimes required that a size of image data to be acquired by image data acquiring means 11 is changed depending on a difference between the print sizes, or image processing for the acquired image data (such as a size change, and an unillustrated image processing means is needed in this case) is conducted), (2) information concerning exposure to color film 3 by a camera (for example, information about using an electronic flash on a camera, a location for photographing and photographing time are given, and it is sometimes required that conditions for image acquisition by image data acquiring means 11 are changed by using the information stated above, or image processing for the acquired image data (such as processing to convert colors, and an unillustrated image processing means is needed in this case) is conducted), (3) information to specify exposed image frames (utilization of this information can shorten the scanning time because image data acquiring means 11 has only to scan an area where image frames actually exist) and (4) information to specify image frames to be scanned by image data acquiring means 11 (utilization of this information makes it possible to prevent acquisition of unnecessary image data because it is possible to scan only image frames designated to be necessary for acquisition of image data, and to use effectively a capacity of an image data storing medium when storing image data in the image data storing medium). These have an influence on processing for image data, when acquiring image data with image data acquiring means 11, or after the image data are acquired by the image data acquiring means 11. Therefore, these pieces of information are required to be acquired before scanning by image data acquiring means 11 is conducted. In an embodiment of the invention, this requirement is satisfied, because these pieces of information are read by the magnetic information reading means 10 before a series of processes of color developing, bleaching, fixing and stabilizing are conducted for color film 3.

Image data recording means 15 is one that records image data acquired by image data acquiring means 11 and stored in storing means 14 (HDD, ROM and RAM) on an image data recording medium (removable media such as a floppy disk, CDROM, ZIP and DVD are preferable). With regard to this recording, it is preferable that all image frames equivalent to one roll of color film 3 are recorded collectively when they are completed in the storing means 14. The reason for this lies in the following. When color film 3 is conveyed improperly, or troubles are caused on the apparatus, there is a possibility that an image data recording medium in which all image data of image frames equivalent to one roll of color film 3 are not stored yet is caused, and when this is caused, extremely troublesome jobs need to be carried out when controlling the image data recording medium physically or when recording image data of remaining image frames on the image data recording medium again.

Display means 16 is one that can display images based on image data acquired by image data acquiring means 11, and it is preferable that an arrangement is made so that image data are automatically displayed before the image data are recorded on an image data recording medium by image data recording means 15. Further, there may also be provided a recording permission information inputting means with which an operator who has observed the display means can input information that allows, or does not allow the image data representing a basis of the image observed by the operator to be recorded on an image data recording medium. By doing this, image data can be recorded properly on the image data recording medium. When information that does not allow the image data to be recorded is inputted, it is possible either to scan again with image data acquiring means 11 or to acquire image data with another image data acquiring means 11 after drying at drying section 8 because processing of the succeeding color film is delayed if the scanning is conducted again by the image data acquiring means 11.

Network connection means 17 (which means communication means 17 in the drawing) is a means to connect image data storing means 14 with the outside. Being connected with outer network 18 through the network connection means 17 (communication means 17), it may also be made useful for the service through an outer personal computer (not shown) and the internet (a type of outer network 18). In this case, image data stored in image storing means 14 may be made useful, after being converted by a prescribed image conversion processing program, for the service wherein image data are delivered to the customer's personal computer through the network connection means 17 and public lines, or for the service to store images in the server installed in a photofinishing laboratory, or for the service wherein a customer can peruse through WWW browser. It is also possible to provide a service to make prints based on image data delivered to the outside through network connection means 17.

Incidentally, as information to be recorded on an image data recording medium, in addition to image data acquired by image data acquiring means 11, there may also be recorded thumbnail images for the image data and a software which displays regular images (images based on original image data) when the thumbnail images are selected.

Though the speed (unit: bps) of recording on an image data recording medium by image data recording means 15 is faster than that (unit: bps) of reading image data by image data acquiring means 11, it is possible to reduce a capacity of storing means 14 when storing successively image data obtained from color film 3 by image data acquiring means 11 in an image data recording medium, which is preferable.

Though image data acquiring means 11 and paired rollers 12 are provided between fixing tank 6 and stabilizing tank 7 in the example stated above, it is also possible to arrange so that image data acquiring means 11 shown in FIGS. 2 and 3 and paired rollers 12 are provided between stabilizing tank 7 and drying section 8. Further, though an example of one stabilizing tank 7 is shown in the example stated above, a plurality of stabilizing tanks may also be used, and in this case, image data acquiring means 11 shown in FIGS. 2 and 3 and paired rollers 12 may also be provided between these stabilizing tanks. It is also possible to arrange so that image data acquiring means 11 is a path covering from the point where a transmission type film emerges out of the first processing tank to the point immediately before entering a drying section in the whole transmission type films, and it is provided on the conveyance path outside a solution. Incidentally, with regard to a scanning method of the image data acquiring means 11, reflection type scanning is advantageous in the processing step where a desilvering step is not completed such as those after color developing processing or bleaching processing, while, transmission type scanning is advantageous after fixing processing or stabilizing processing where a desilvering step is completed.

Figure 5:
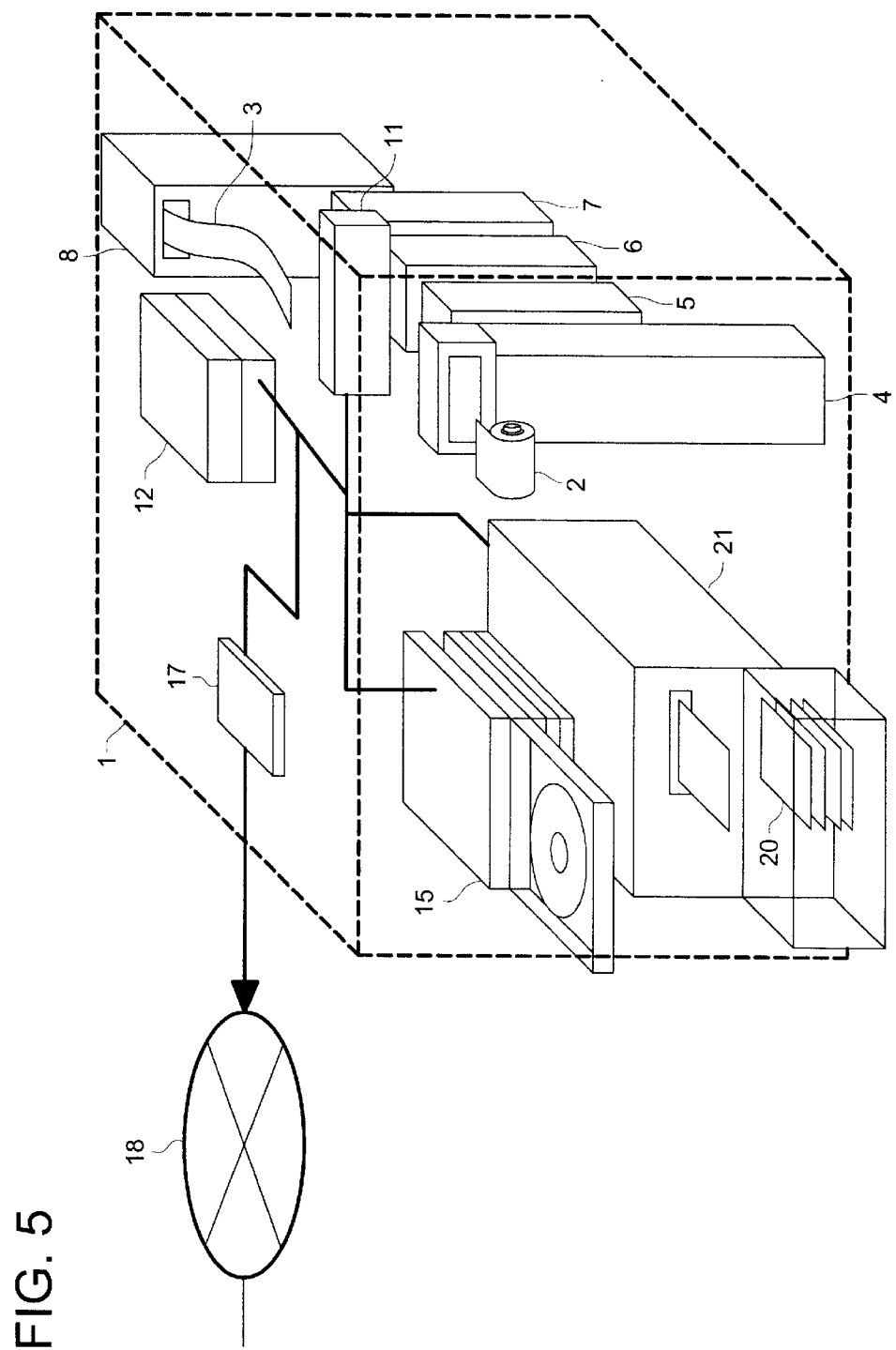
FIG. 5 is a perspective view.

FIG. 5 shows one wherein image outputting means 21 is further added integrally to automatic photographic processing and scanning apparatus 1 explained in FIGS. 1–4. The numeral 20 is a print. In this case, control means 1.3 is not shown. As the image outputting means 21, there are given a developing machine to obtain a print by using a silver halide photographic light-sensitive material, a printer to obtain a print by using sublimation type heat-sensitive recording material, an ink jet printer, a printer employing a full-color direct heat-sensitive recording material and a printer employing a thermal sublimation transfer recording material of a postchelating type. By doing this, it is possible to deliver a print and CD-R simultaneously to a customer when film developing is about finished.

In the automatic photographic processing and scanning apparatus which conducts a series of developing processes for a color film and to obtain image data by scanning a color film during processing before the film is dried, the invention makes it possible to improve image quality of image data obtained through scanning, to enhance efficiency in point of time for recording the image data obtained through scanning on an image data recording medium, and to make the control of the image data recording medium easy.

What is claimed is:

1. An automatic film processing apparatus comprising:
   (a) a processing station for photographic-processing a film;
   (b) a scanner for scanning the film during the photographic-processing by the processing station;
   (c) an image data memory for storing image data acquired by the scanner; and
   (d) an image output device for outputting the image data stored in the image data memory in parallel with a following photographic processing;
   wherein the scanner is adapted to scan a part of the film that is substantially in a horizontal direction after at least one of a fixing processing and a stabilizing processing, and is positioned above said part of the film in a vertical direction.

2. The automatic film processing apparatus of claim 1, wherein the scanner scans the film after the fixing processing.

3. The automatic film processing apparatus of claim 1, wherein the scanner scans the film in a state when conveyance of the film has been stopped.

4. The automatic film processing apparatus of claim 3, wherein the film comprises a plurality of image frames, and the scanner scans the film in a state when conveyance of the film has been stopped for each image frame.

5. The automatic film processing apparatus of claim 1, further comprising a roller that comes in contact with the film immediately before a path through which the film advances to the scanner, and wherein the roller is made of a material having a water absorption property.

6. The automatic film processing apparatus of claim 5, wherein the roller is porous.

7. The automatic film processing apparatus of claim 5, wherein a surface of the roller comprises one of polybutyl terephthalate, polyphenylene ether, polypropylene, polyurethane, vinyl chloride, polyethylene and polyvinyl alcohol.

* * * * *